United States Patent
Dolson et al.

(10) Patent No.: US 7,804,899 B1
(45) Date of Patent: Sep. 28, 2010

(54) SYSTEM AND METHOD FOR IMPROVING TRANSRATING OF MPEG-2 VIDEO

(75) Inventors: David Dolson, Waterloo (CA); Lowell Winger, Waterloo (CA); Michael Gallant, Guelph (CA); Guy Cote, Elora (CA)

(73) Assignee: Cisco Systems Canada Co., Halifax, Nova Scotia (CA)

( * ) Notice: Subject to any disclaimer, the term of this patent is extended or adjusted under 35 U.S.C. 154(b) by 2464 days.

(21) Appl. No.: 09/905,600

(22) Filed: Jul. 13, 2001

(51) Int. Cl.
*H04B 1/66* (2006.01)

(52) U.S. Cl. .............. 375/240.12; 375/240.24; 375/240.25; 375/240.26; 382/233; 382/235; 382/238

(58) Field of Classification Search ............ 375/240.12, 375/240.24, 240.25, 240.26, 240.01; 382/233, 382/235, 238, 239
See application file for complete search history.

(56) References Cited

U.S. PATENT DOCUMENTS

| | | | |
|---|---|---|---|
| 5,638,130 A | 6/1997 | Linzer | |
| 6,181,711 B1 | 1/2001 | Zhang et al. | |
| 6,556,627 B2 * | 4/2003 | Kitamura et al. | 375/240.26 |
| 6,560,282 B2 * | 5/2003 | Tahara et al. | 375/240.02 |
| 2002/0196853 A1 * | 12/2002 | Liang et al. | 375/240.16 |

OTHER PUBLICATIONS

Zhang, et al., U.S. Appl. No. 09/874,467, "Efficient Systems and Methods for Transmitting Compressed Video Data Having Different Resolutions", filed Jun. 4, 2001.
ISO/IEP "Information Technology—Generic Coding Of Moving Pictures And Associated Audio: Systems", ISO/IEC 13818-1, Nov. 13, 1994, 136 pages.
ISO/IEP "Information Technology—Generic Coding Of Moving Pictures And Associated Audio Information: Video", ISO.IEC 13818-2, 1995, 209 pages.
ISO/IEP "Information Technology—Generic Coding Of Moving Pictures And Associated Audio: Audio", ISO/IEP 13818-3, Nov. 11, 1994, 104 pages.

* cited by examiner

*Primary Examiner*—Shawn An
(74) *Attorney, Agent, or Firm*—Weaver Austin Villeneuve & Sampson LLP

(57) ABSTRACT

The present invention discloses how a transcoder may be used to reduce the bit rate of an MPEG-2 stream by transmitting only the visible area of the movie specified by pan-scan directives. Because the pan-scan conversion is performed prior to transmission, not immediately before display, the non-viewed portion of video does not need to be transmitted.

12 Claims, 7 Drawing Sheets

SYSTEM AND METHOD FOR IMPROVING TRANSRATING OF MPEG-2 VIDEO

FIELD OF THE INVENTION

The present invention relates generally to systems and methods for transrating MPEG-2 video streams to meet the available bitrate of a transmission medium. More specifically the present invention relates to transrating the macroblocks of an MPEG-2 stream, which fall within a pan-scan area.

BACKGROUND OF THE INVENTION

Throughout the disclosure and claims, we will be using the term MPEG (Motion Pictures Expert Group). MPEG is a generic reference to a family of international standards, which define how to encode visual and audio information in a digital compressed format.

MPEG is utilized in a wide variety of applications, including: DVD (Digital Video Discs) and DVB (Digital Video Broadcasting).

The MPEG standards specify exactly the format in which the compressed data is to be transmitted. A key feature of MPEG is that it can compress a video signal into a fraction of its original size. MPEG achieves a high compression for video by storing only the changes from one video frame to another, instead of each entire frame.

There are two major MPEG standards: MPEG-1 and MPEG-2. The most common implementations of the MPEG-1 standard provide video quality slightly below the quality of conventional VCR (Video Cassette Recorder) videos. MPEG-2 provides higher resolution, with full CD quality audio. This is sufficient for the major TV standards, including NTSC (National Standards Television Committee) and HDTV (High Definition Television.

Of the series of MPEG standards that describe and define the syntax for video broadcasting, the standard of relevance to the present invention is ISO/IEC IS 13818-2, ITU-T Recommendation the MPEG-2 standard, titled "Generic Coding of Moving Pictures and Associated Audio Information: Video.", which is incorporated herein by reference and is hereinafter referred to as "the MPEG-2 Standard"

Additional standards incorporated herein by reference are:

1) MPEG-2 Systems Group. Information Technology—Generic Coding of Moving Pictures and Associated Audio: Part 1—Systems, ISO/IEC 13180-1 International Standard 1995.

2) MPEG-2 Video Group. Information Technology—Generic Coding of Moving Pictures and Associated Audio: Part 2—Video ISO/IEC 13818-2 International Standard, 1995.

If an MPEG stream is to be viewed immediately as it is received, the communication channel must have enough bit rate capacity to provide the series of pictures at a real-time rate. Bit rate is the number of digital bits which a communication channel can transmit per second. Alternatively, pictures can be encoded to a size suitable for a channel of a given bit rate. MPEG encoding allows the size of each picture to be adjusted by varying quality; smaller pictures may be achieved at the expense of lower quality. The objective of an MPEG encoding is to maximize quality for the available bit rate.

Consider a system in which high-quality MPEG video is to be played directly from a storage medium; DVD is an example. The video quality is high, as instantaneous bit rate is of relatively low concern. Consider now that the stored high-quality video is to be communicated across a channel of constrained bit rate such as a telephone line. Some device must re-encode each picture (with potential reduction of quality) so the sequence of pictures may be transmitted in real time within the available bit rate.

A transcoder is a device which converts an encoded bit stream of one bit rate to a lower bit rate, and changes the content of the encode bit stream. This device is useful when down-stream channels operate at a lower rate than the up-stream channel.

An example would be the retrieval of data from a DVD drive at very high bit rate (and high quality) and transmission over phone line at a lower rate (and lower quality). The manner in which picture quality is traded-off for bits is a matter of transcoder design. Ideally, changes are made where they are least likely to be noticed by the viewer.

Traditional film mediums utilize the 35 mm format. This format provides a 4:3 aspect ratio. An aspect ratio is the ratio of width to height of an image on a television, motion picture, or computer screen. As movie making technology developed, a wide screen format became more popular. This format is often referred to as "Cinemascope", "wide screen" or "letter-box". This format has an aspect ratio of 16:9.

When digital video is stored on a high-speed storage device, such as a DVD, the bit rate of the stream is often less important than the quality and inclusion of special features. One such special feature is the recording of a movie in a 16:9 aspect ratio, which doesn't use up all of the screen area of a standard TV (4:3 aspect ratio). When viewed on a standard TV, a letterbox movie will have black bars at the top and bottom of the television screen, as a result of scaling down the image to fit the screen.

The MPEG-2 standard provides a means for embedding "pan-scan" information in a video bit stream. Pan-scan information defines which rectangular area of the stream is to be displayed for an aspect ratio different from the original recording.

U.S. Pat. No. 5,638,130, discloses the use of pan-scan conversion, but after the MPEG-2 stream has been decoded. This requires that the MPEG-2 stream be decoded prior to selecting the pan-scan conversion. This does not address the issue of reducing bit rate requirements between the source and the end consumer.

There is thus a need for a transcoder capable of reducing the bit rate of an MPEG stream between the source of the MPEG stream and the final consumer. The present invention addresses this need.

SUMMARY OF THE INVENTION

The present invention relates to a system and method for utilizing a transcoder to reduce the content of an MPEG-2 stream where applicable.

One aspect of the present invention is a method of determining if the content of a MPEG-2 source stream, may be reduced, the method having the steps of:

a) examining the source stream to determine if a sequence_display_extension follows the most recent sequence header and sequence extension;

b) confirming that horizontal_size is greater than display_horizontal_size or that vertical_size is greater than display_vertical_size; and c) if steps a) and b) are met, reducing the content of the source stream to create a reformatted stream.

In another aspect of the present invention, there is provided a system for reducing the content of an MPEG-2 stream, the system containing:

a) a transcoder, the transcoder converting a source stream to a reformatted stream;

b) a transmitter connected to the transcoder, for transmitting the reformatted stream;

c) a receiver connected to the transmitter, for receiving the reformatted stream; and d) a decoder connected to the receiver, for decoding the reformatted stream and providing as output a viewable stream.

In another aspect of the present invention, there is provided a computer readable medium containing instructions for reducing the content of an MPEG-2 source stream, said instructions performing the steps of:

a) examining the source stream to determine if a sequence_display_extension follows the most recent sequence header and sequence extension;

b) confirming that horizontal_size is greater than display_horizontal_size or that vertical_size is greater than display_vertical_size; and c) if steps a) and b) are met, reducing the content of the source stream to create a reformatted stream.

In another aspect of the present invention there is provided a system for repositioning frames in an MPEG-2 stream said system including repositioning means, the repositioning means utilizing pan-scan information to relocate a display rectangle to a reconstructed frame.

In another aspect of the present invention there is provided a video transcoder, the transcoder including a pan-scan module. The pan-scan module performing the steps of:

a) examining a source video stream to determine if a sequence_display_extension follows the most recent sequence header and sequence extension;

b) confirming that horizontal_size is greater than display_horizontal_size or that vertical_size is greater than display_vertical_size; and c) if steps a) and b) are met, reducing the content of said source stream to create a reformatted stream.

In yet another aspect of the present invention there is provided a pan-scan module, the pan-scan module residing within a video transcoder, the module including:

a) a selector for examining a source stream to determine if the source stream may be reduced;

b) a first calculator connected to the source stream to calculate the values of: width_mb and height_mb;

c) a second calculator connected to the source stream for calculating the values of: top, bottom, left and right;

d) a third calculator connected to the source stream for calculating the values of top_mb, bottom_mb, left_mb and right_mb; and e) a modifer taking as input the calculations performed by the first, second and third calculators to create a reformatted stream.

BRIEF DESCRIPTION OF THE DRAWINGS

For a better understanding of the present invention, and to show more clearly how it may be carried into effect, reference will now be made, by way of example, to the accompanying drawings which aid in understanding an embodiment of the present invention and in which:

FIG. 6 is a block diagram illustrating the components of the Pan-scan module of FIG. 5a.

DETAILED DESCRIPTION OF THE PREFERRED EMBODIMENTS

The transmission and reception of digital video requires complex hardware and software components. It is not the intent of this disclosure to address all such components but rather to address the specific areas within a digital video system in which the present invention may be utilized.

Figure 1:
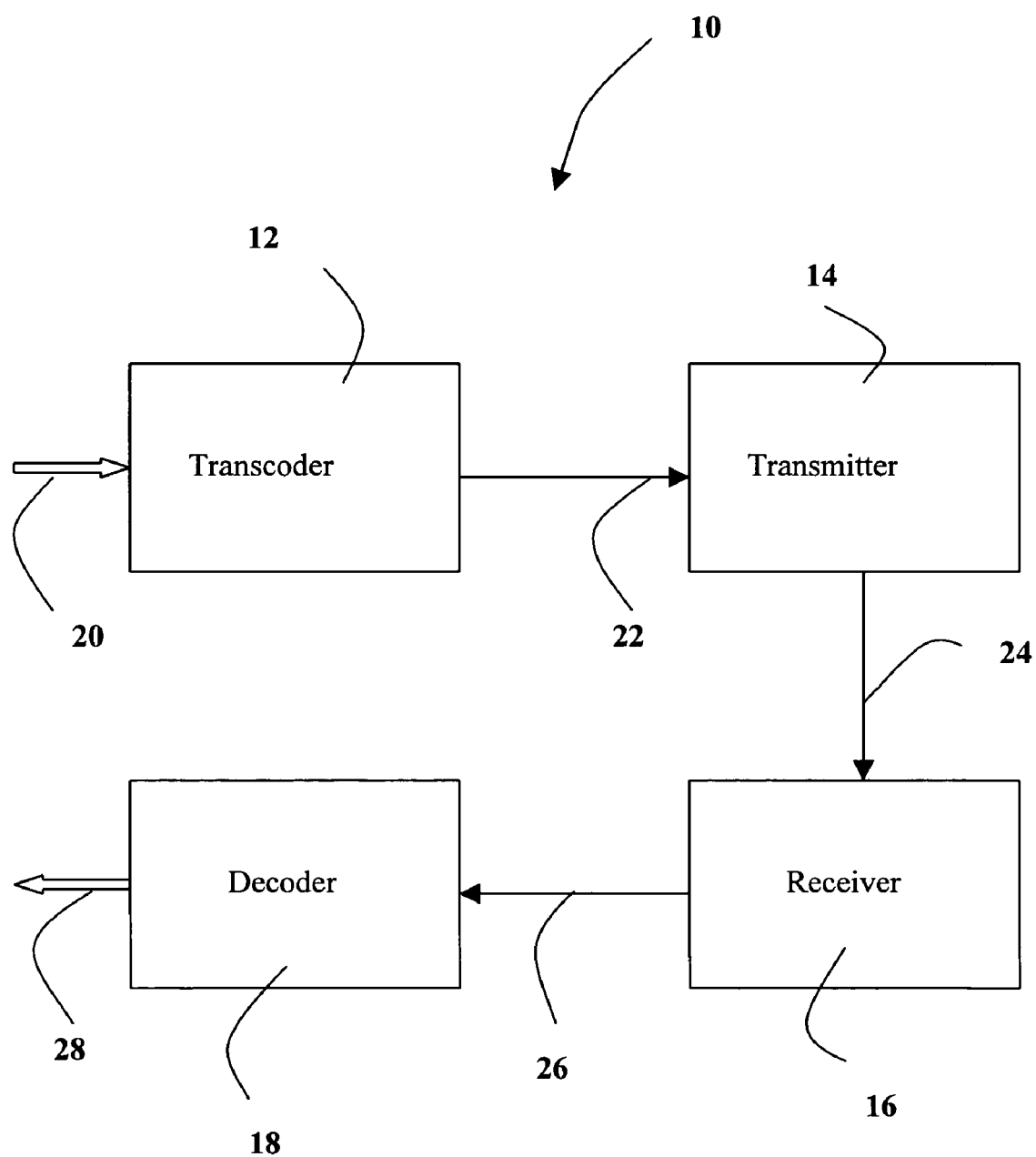
FIG. 1 is a block diagram of a system utilizing the present invention.

By way of introduction we refer first to FIG. 1, a system utilizing the present invention, shown generally as 10. System 10 is an overview of a generic system in which the present invention may be utilized. System 10 comprises transcoder 12, transmitter 14, receiver 16 and decoder 18. Transcoder 12 accepts as input source stream 20. For the purpose of simplicity the reader may think of source stream 20 as being a high bit rate MPEG-2 stream. However, it is not the intent of the inventors to restrict stream 20 to the format that is defined within the current MPEG-2 standard. Transcoder 12 receives source stream 20 and reformats it to a reformatted stream (not shown). The intent of creating a reformatted stream is to reduce the amount of data required to be sent to transmitter 14. The reformatted stream is sent to transmitter 14 via communications link 22. Transmitter 14 then forwards the reformatted stream to receiver 16 via communications link 24. Receiver 16 then forwards the reformatted stream to decoder 18 via communications link 26. Decoder 18 accepts the reformatted stream and decodes it to output a viewable stream 28 to the end user, which in this example would be one or more individuals viewing a video sequence on a display device, such as a television or computer monitor.

As one skilled in the art will recognize, communications links 22, 24, and 26 may take on a variety of forms such as, satellite transmission, wireless transmission, coaxial cable, twisted pair, internal computer bus, or any other form of transmitting data.

An MPEG stream is essentially a series of pictures taken at closely spaced time intervals. In the MPEG standards a picture is referred to as a "frame". This is terminology we will use from now on.

The basic building block of an MPEG frame is a macroblock. A macroblock consists of a 16×16 array of luminence (grayscale) pixels together with two 8×8 blocks for chrominance (colour) pixels. It is not the intent of this disclosure to discuss the technical details of the information in a macroblock as it is well known to those skilled in the art and well defined in the MPEG-2 standard. At the introductory level, one may consider a macroblock to be a digital equivalent of a portion of a traditional analog RGB (red, green, blue) television signal.

Figure 2:
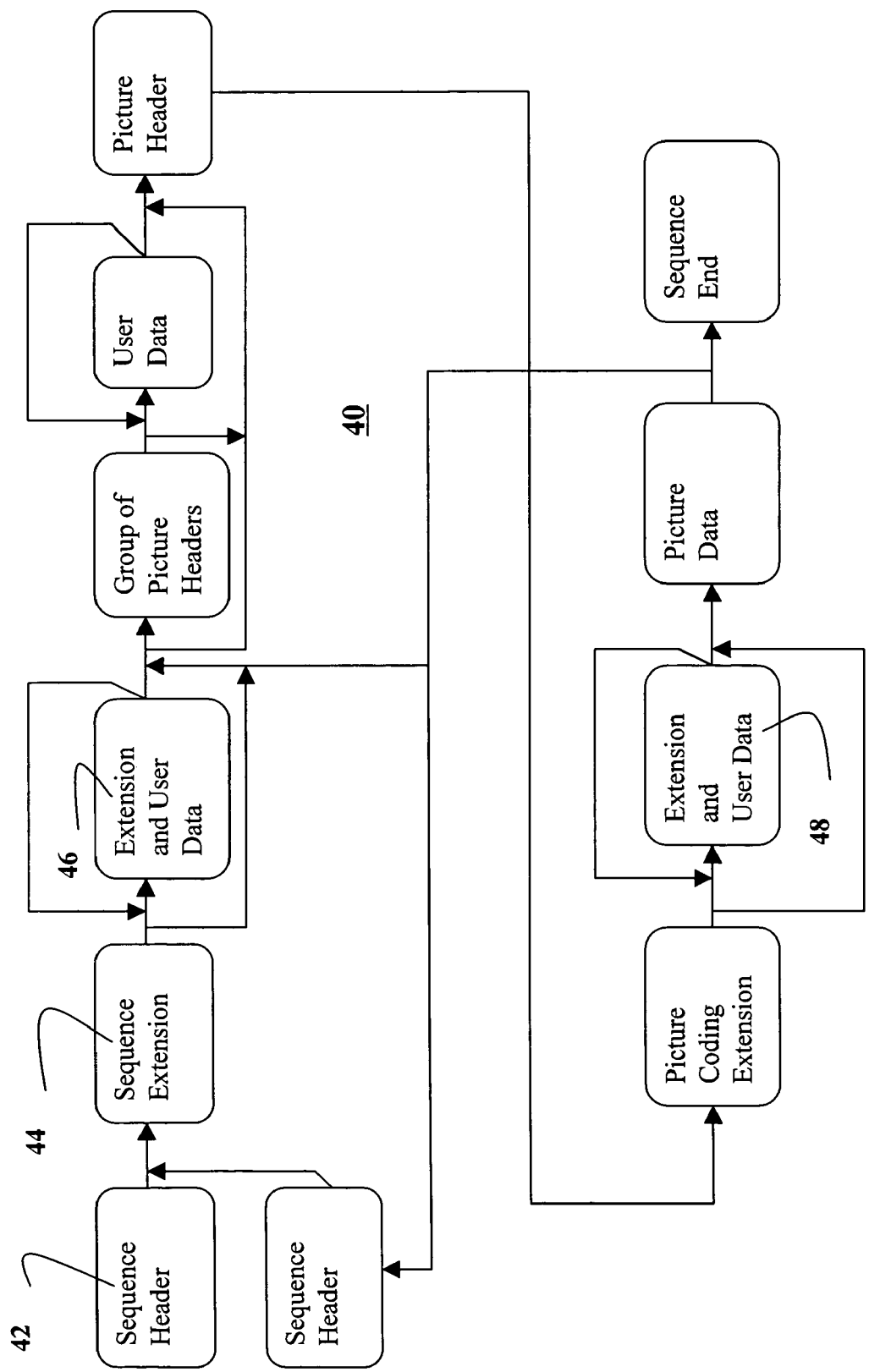
FIG. 2 is a block diagram of the syntax of an MPEG-2 video stream.

Referring now to FIG. 2, a block diagram of the syntax of an MPEG-2 video stream is shown generally as 40. The syntax of steam 40 is described in detail in the MPEG-2 standard. The components of stream 40 of relevance to the present invention are: sequence header 42, sequence extension 44 and extension and user data 46.

Sequence header 42 contains the fields illustrated in Table 1.

TABLE 1

Sequence Header (42)

| Field Name | Field Size |
| --- | --- |
| sequence_header_code | 32 bits |
| horizontal_size_value | 12 bits |
| vertical_size_value | 12 bits |
| other | 36 to 1060 bits |

Sequence extension 44 contains the fields illustrated in Table 2.

TABLE 2

Sequence Extension (44)

| Field Name | Field Size |
| --- | --- |
| extension_start_code | 32 bits |
| extension_start_code_identifier | 4 bits |
| profile_and_level_indication | 8 bits |
| progressive sequence | 1 bit |
| chroma_format | 2 bits |
| horizontal_size_extension | 2 bits |
| vertical_size_extension | 2 bits |
| other | ... |

As shown in Table 2, sequence extension 44 contains an "extension_start_code_identifier" field. If this field contains the binary value of 0010 then sequence extension 44 defines a "sequence_display_extension" as illustrated in Table 3. The sequence_display_extension is contained within Extension and User data block 48 of FIG. 2.

TABLE 3 sequence display extension

| Field Name | Field Size |
| --- | --- |
| extension_start_code_identifier | 4 bits (0010) |
| video format | 3 bits |
| colour_description | 1 bit |
| colour information | 0 to 24 bits |
| display_horizontal_size | 14 bits |
| marker_bit | 1 bit |
| display_vertical_size | 14 bits |

As shown in Table 2, sequence extension 44 contains an "extension_start_code_identifier" field. If this field contains the binary value of 0111 then the sequence extension defines a "picture_display_extension" as illustrated in Table 4. The picture_display_extension is contained within Extension and User data block 46 of FIG. 2.

TABLE 4 picture display extension

| Field Name | Field Size |
| --- | --- |
| extension_start_code identifier | 4 bits (0111) |
| frame_centre_horizontal_offset | 16 bits |
| marker_bit | 1 bit |
| frame_centre_vertical_offset | 16 bits |
| marker bit | 1 bit |

The block of contiguous fields in Table 4 comprising: frame_centre_horizontal_offset, marker_bit, frame_centre_vertical_offset and marker_bit, may occur from one to three times. The number of occurrences is based upon the value of "number_of_frame_centre_offsets" which is defined in the MPEG-2 standard.

The fundamental unit of measurement in repositioning a frame is the macroblock unit, which is a single row of a 16×16 luminance macroblock.

Within sequence_header 42 (FIG. 1, Table 1), are contained the 12-bit fields of horizontal_size_value and vertical_size_value. Within sequence_extension 44 (FIG. 2, Table 2), the 2-bit horizontal_size_extension and vertical_size_extension fields are found. The dimensions of a frame are defined by horizontal_size and vertical_size. The horizontal_size is a 14-bit unsigned integer made up from horizontal_size_extension (making the most significant 2 bits) and horizontal_size_value (making the least significant 12 bits). Similarly, vertical_size is a 14-bit unsigned integer made up from vertical_size_extension (making the most significant 2 bits) and vertical_size_value (making the least significant 12 bits).

In calculating the repositioning of a frame, we will make use of the functions floor( ) and ceil( ) These functions are well known to those skilled in the art. The function floor( ) provides a rounding method that rounds toward zero by truncating. For example, 2.5 rounds to 2 and −2.5 rounds to −2. The function ceil( ) is a rounding method that rounds away from zero by truncating. For example, 2.5 rounds to 3 and −2.5 rounds to −3.

The width of each frame in macroblock units is:

width_mb=ceil(horizontal_size/16).

The height of each frame in macroblock units depends on whether the sequence of frames is interlaced or progressive. MPEG-2 supports two scanning methods, one is interlaced scanning and the other is progressive scanning. Interlaced scanning scans odd lines of a frame as one field, and even lines as another field. Progressive scanning scans the consecutive lines in sequential order.

In interlaced frames, frames may then be coded as either a frame picture or as two separately coded field pictures.

The 1-bit value progressive_sequence is found within sequence_extension 44 (FIG. 2, Table 2). If progressive_sequence contains a value of "1", the height of each picture in macroblock units is;

height_mb=ceil(vertical_size/16).

If progressive_sequence contains a value of "0", either frame or field pictures may occur: the height of frame pictures in macroblock units is;

height_mb=2*ceil(vertical_size/32), and the height of field pictures in macroblock units is height_mb=ceil(vertical_size/32).

Each picture, be it a frame picture or a field picture may have associated with it a picture_display_extension (Table 4). Of interest to us are the fields: frame_centre_horizontal_offset and frame centre vertical offset. The values in these fields are each 16-bit signed integer quantities representing the pan-scan offset in units of 1/16th of a sample. For frame_centre_horizontal_offset, a positive value indicates that the center of the reconstructed frame lies to the right of the center of the display rectangle. For frame_centre_vertical_offset, a positive value indicates that the center of the reconstructed frame lies below the center of the display.

Figure 3:
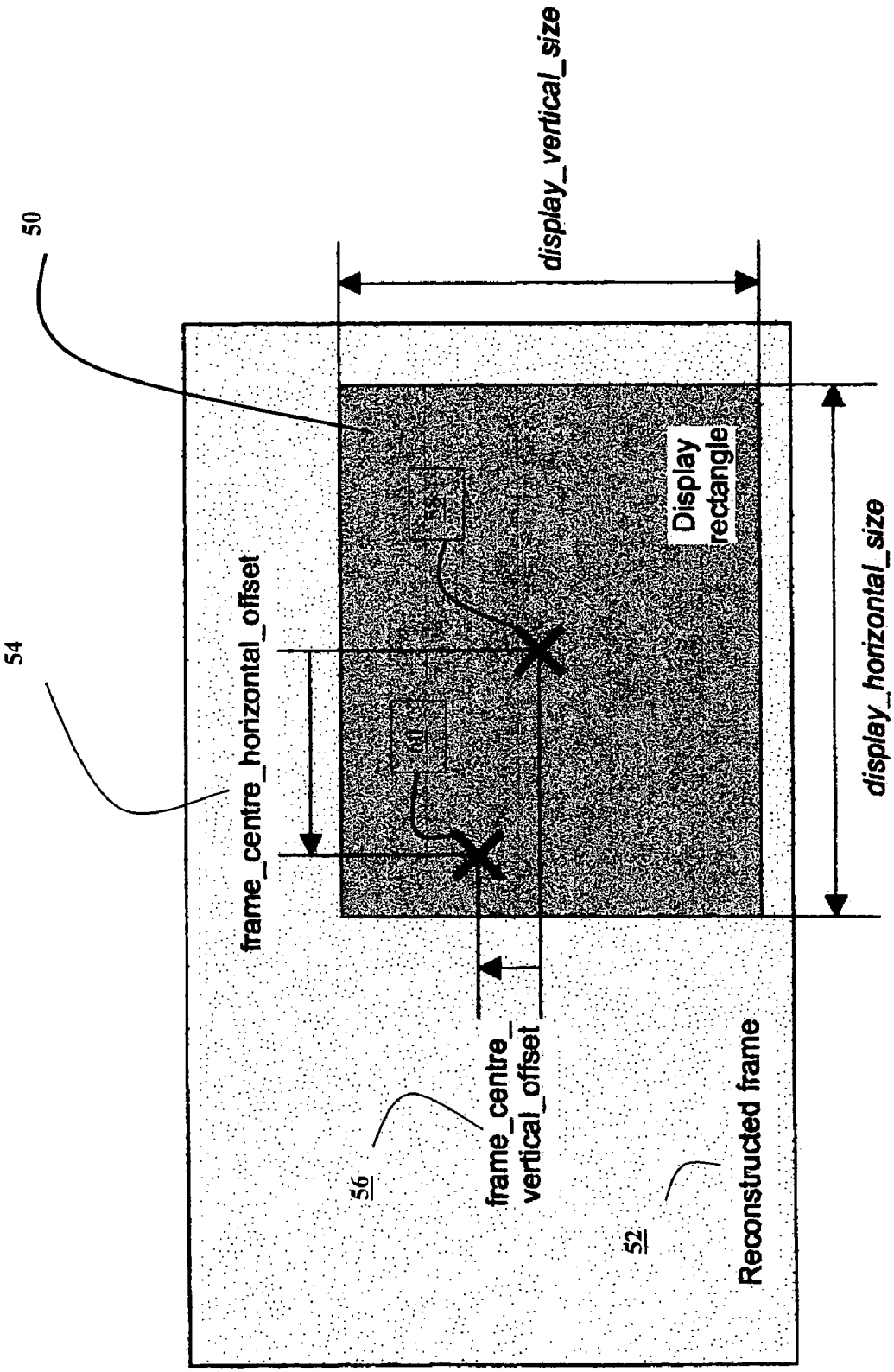
FIG. 3 is a schematic diagram illustrating the repositioning of a frame.

By way of explanation of the above terminology, we now refer to FIG. 3, a schematic diagram illustrating the repositioning of a frame. Display rectangle 50 contains the frame to be repositioned in reconstructed frame 52. In order to best position display rectangle 50 within reconstructed frame 52 the present invention makes use of frame centre horizontal offset 54 and frame centre vertical offset 56. The values of these fields are contained within the picture_display_extension as shown in Table 4. As shown in FIG. 3, the centre of display rectangle 50 is illustrated as centre 58. Based upon the values of frame_centre_horizontal_offset 54 and frame_centre_vertical_offset 56, centre 58 becomes new centre 60, i.e. the centre of reconstructed frame 52.

The present invention will not modify source stream 20 (FIG. 1) unless both of the following conditions are true:
1. A sequence_display_extension (Table 3) follows the most recent sequence header 42 and sequence extension 44. This is necessary so that the values of display_horizontal_size and display_vertical_size are known.
2. Either horizontal_size is greater than display_horizontal_size or vertical_size is greater than display_vertical_size. In either of these cases there may be macroblocks that lie outside of the viewable area.

If the above conditions are true, the present invention will modify source stream 20, executing as follows for each frame:

First, the display rectangle 50 is computed in the coordinates of the reconstructed frame 52 in units of 1/16 pixel:

$$top=(vertical\_size/2)*16-frame\_centre\_vertical\_offset-(display\_vertical\_size/2)*16$$

$$left=(horizontal\_size/2)*16-frame\_centre\_horizontal\_offset-(display\_horizontal\_size/2)*16$$

$$bottom=top+display\_vertical\_size*16$$

$$right=left+display\_horizontal\_size*16$$

Next, the values of top, left, bottom and right are rounded off to whole macroblock units as shown by the following pseudo code.

Value of top_mb
if top<zero then
    top_mb=0
else
    if progressive_sequence==1 then
        top_mb=floor ((top/16)/16)
    else
    if a field picture then
        top_mb=floor((top/16)/32))
    else
        top_mb=2*floor((top/16)/32)

Value of left_mb
if left <zero then
    left_mb=0
else
    left_mb=floor(left/256)

Value of bottom_mb
if progressive_sequence==1
    bottom_mb=ceil((bottom/16)/16)
else
    if a field picture
        bottom_mb=ceil((bottom/16)/32)
    else
        bottom_mb=2*ceil((bottom/16)/32)

if bottom_mb>(height_mb−1)
    bottom_mb=height_mb−1

Value of right_mb
if ceil(right/256)<(width_mb−1)
    right_mb=ceil(right/256)
else
    right_mb=(width_mb−1)

Thus the size of reconstructed frame 52 becomes:

$$new\_horizontal\_size=(right\_mb-left\_mb+1)*16$$

$$new\_vertical\_size=(bottom\_mb-top\_mb+1)*16$$

Figure 4:
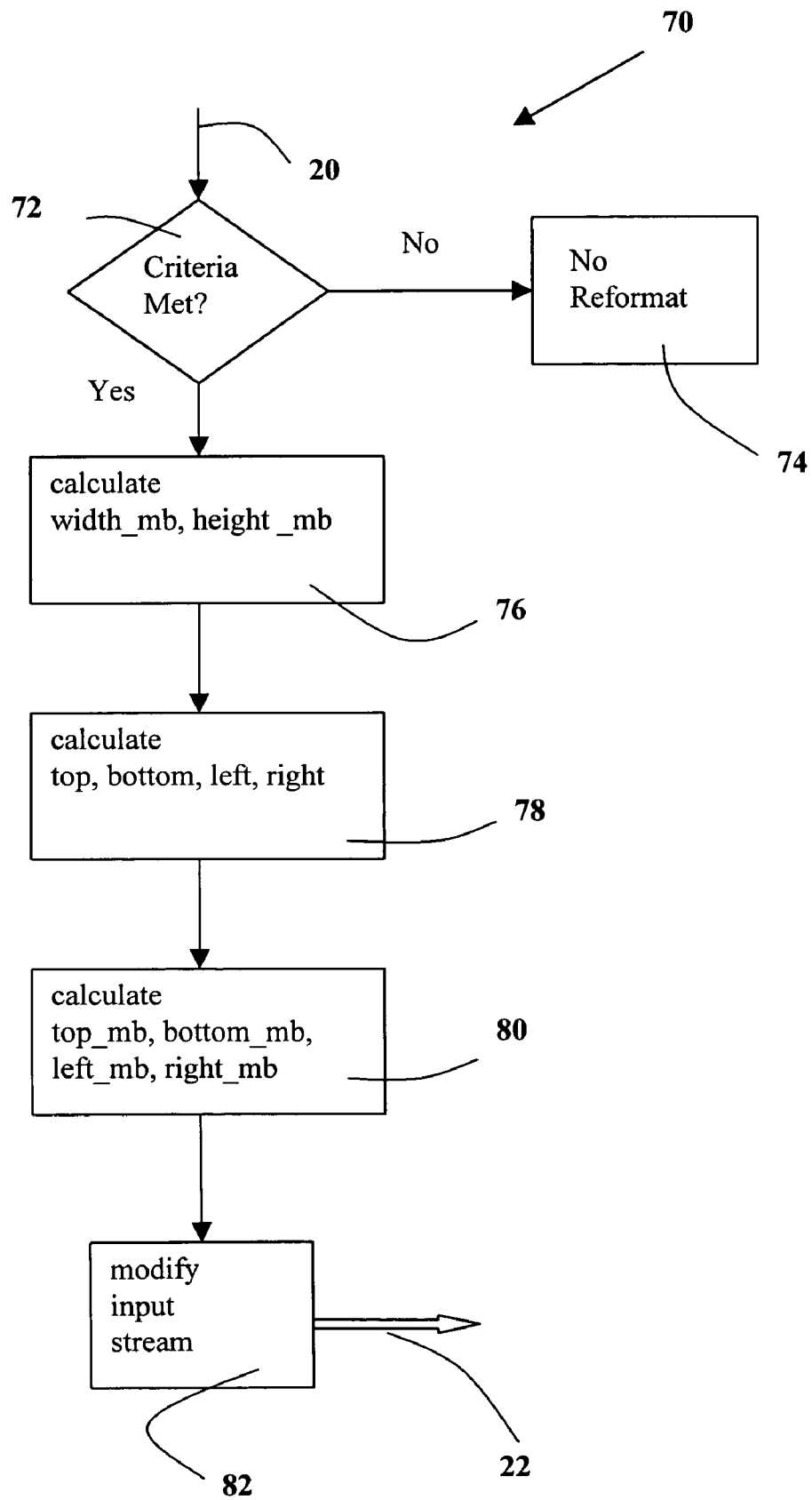
FIG. 4 is a flowchart of the source stream reformatting process.

To further aid the reader in understanding the above sequence of computations, we refer now to FIG. 4, a flowchart of the source stream reformatting process, shown generally as 70. At step 72, source stream 20 is examined to determine if the reformatting conditions as described above have been met. If the conditions have been met the process moves to step 76 else the process terminates at step 74 as no reformatting is required. At step 76 the values of width_mb and height_mb are calculated as described above. These values define the width and height of display rectangle 50, before reconstruction, in macroblock units. At step 78 the values of top, bottom, left and right are calculated. These values define the position of the frame (display rectangle 50), within reconstructed frame 52. At step 80 the values of top, bottom, left and right are rounded off to whole macroblock units. At step 82, source stream 20 is modified to create a reformatted stream containing the new position of reconstructed frame 52. The reformatted stream is then output via communication link 22 (FIG. 1).

The reformatted stream transmitted via communication links 22, 24 and 26 is a copy of source stream 20 (FIG. 1), save for the following modifications.

1. In sequence_header 42 (FIG. 2, Table 1), horizontal_size_value takes the 12 least significant bits of new_horizontal_size and vertical_size_value takes the 12 least significant bits of new_vertical_size.

2. In sequence_extension 44 (FIG. 2, Table 2), horizontal_size_extension takes the 2 most significant bits of new_horizontal_size and vertical_size_extension takes the 2 most significant bits of new_vertical_size.

3. In sequence_display_extension (Table 3), display_horizontal_size takes the value of new_horizontal_size and display_vertical_size takes the value of new_vertical_size. If all of the other items in sequence_display_extension are default values then the sequence_display_extension does not need to be transmitted.

4. The picture_display_extension (Table 4) is not transmitted. It contained the frame center vertical offset and frame center horizontal offset values which are no longer required for reconstructed frame 52.

5. Macroblocks are not included if their horizontal position is less than left_mb or greater than right_mb or if their vertical position is less than top_mb or greater than bottom_mb. These are the macroblocks which lie outside of reconstructed frame 52.

6. Slices which now contain no macroblocks are not included. A slice is a consecutive series of macroblocks which are all located in the same horizontal row of a macroblocks.

7. The value of top_mb is subtracted from each slice_start_code. If the slice_start_code becomes less than 1, it is set to one. This step positions the slices properly vertically. If the slice_start_code had become less than 1, some row(s) of macroblocks would have been removed from the slice. The use and context of slice start code is defined in the MPEG-2 standard.

Figure 5A:
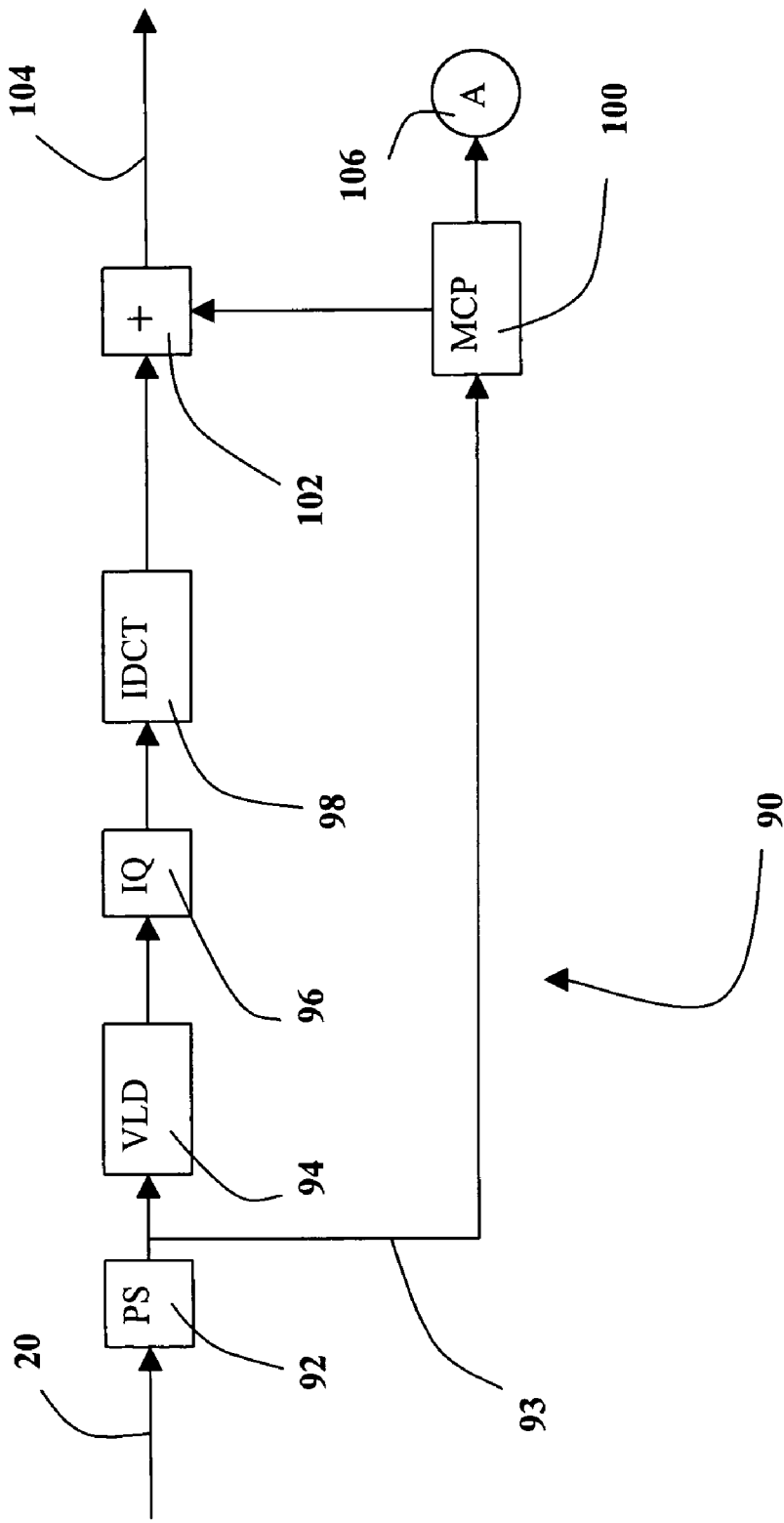
FIGS. 5a and 5b are a block diagram of a transcoder.
Figure 5B:
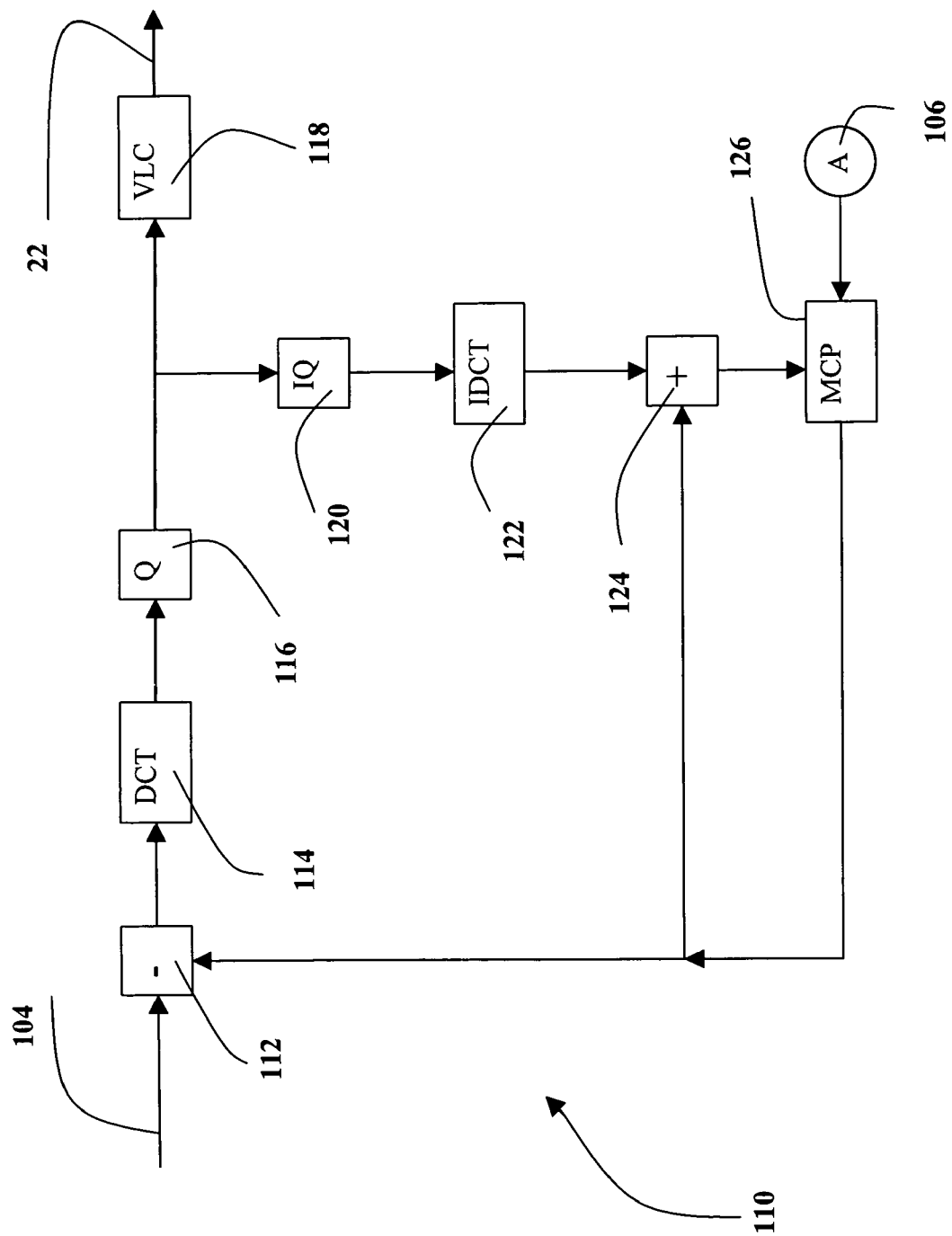

To better illustrate how the present invention may be implemented in transcoder 12 (see FIG. 1); we now refer to FIGS. 5a and 5b. FIG. 5a is a block diagram of the decoder portion of transcoder 12 and is shown generally as 90. FIG. 5b is a block diagram of the encoder portion of transcoder 12 and is shown generally as 110. Thus, transcoder 12 comprises decoder 90 and encoder 110. One may think of transcoder 90 as first decoding source stream 20 to modify it (using decoder 90) and encoding it in a modified format (using encoder 110) for transmission via transmitter 14.

As one skilled in the art will recognize, there are many different forms of transcoders. FIGS. 5a and 5b illustrate the components of a pixel domain MPEG-2 type transcoder. Other variations include DCT domain transcoders and open loop transcoders. It is not the purpose of the present invention to dictate a specific transcoder design, but rather to illustrate how the present invention may be embodied in any transcoder.

Referring now to FIG. 5a, source stream 20 is received by pan-scan module 92. Pan-scan module 92 performs the analysis and reformatting of source stream 20 as disclosed earlier (see FIG. 4), and passes it to Variable Length Decoder 94.

Variable Length Decoder module 94 decodes the stream and passes it to Inverse Quantiser module 96. Inverse Quantiser module 96 reverses the quantisation process originally applied to source stream 20 and passes the modified stream to Inverse Discrete Cosine Module 98. Module 98 reverses the Discrete Cosine Transform originally applied to source stream 20. Motion Compensated Prediction module 100 accepts as input, motion compensation data contained in source stream 20 via link 93. Module 100 then provides picture difference information that is added at block 102 to produce decoded video stream 104. Module 100 also outputs via link 106 characteristic information, such as motion estimation, as found in stream 20. This characteristic information is passed to the MCP module 126 of the encoder as is shown in FIG. 5b.

With regard to the above description of FIG. 5a, it is not the intent of the inventors to describe in detail the functionality of modules 94, 96, 98, 100 and 102. The functionality expected of such modules is defined in the MPEG-2 standard and numerous variations have been published and are well known to those skilled in the art.

Referring now to FIG. 5b, decoded video stream 104 is input to module 112, which subtracts motion compensated prediction from the picture to form a "prediction error" picture. The prediction error picture is passed to Discrete Cosine Transform module 114 which transforms the picture and passes it to Quantiser module 116. Quantiser module 116 quantises the coefficients produced by module 114 and creates a new picture. The new picture may have to be recalculated based upon prediction error, thus the reason for the loop comprising blocks 120, 122 and 124 and 126. Motion Compensation Module 126 accepts as input characteristic information such as motion estimation, via link 106, as shown in both FIGS. 5a and 5b.

Once the picture has been successfully encoded it is passed to Variable Length Coder module 118. Module 118 then transmits the reformatted stream via communications link 22, to transmitter 14 (see FIG. 1).

With regard to the above description of FIG. 5b, it is not the intent of the inventors to describe in detail the functionality of the modules shown. The functionality expected of such modules is defined in the MPEG-2 standard and numerous variations are well known to those skilled in the art.

Figure 6:
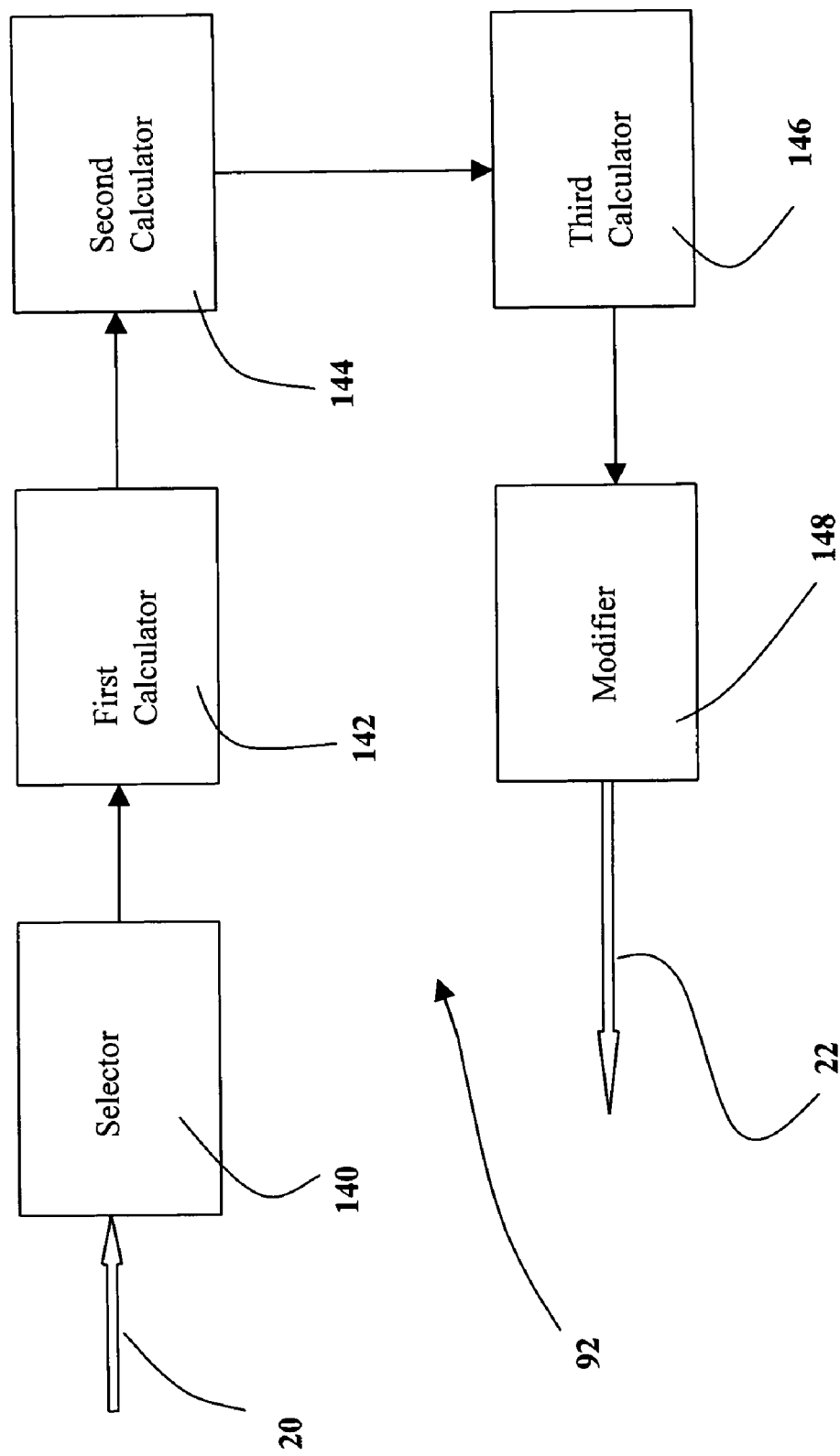

To further illustrate the functionality of the present invention we refer now to now to FIG. 6, a block diagram illustrating the components of the Pan-scan module 92 of FIG. 5a. The components of pan-scan module 92 provide the functionality illustrated in FIG. 4 and as described herein. Selector 140 accepts as input source stream 20 and determines both criteria for modification have been met, namely:

1 A sequence_display_extension (Table 3) follows the most recent sequence header 42 and sequence extension 44. This is necessary so that the values of display_horizontal_size and display_vertical_size are known.

2 Either horizontal_size is greater than display_horizontal_size or vertical_size is greater than display_vertical_size. In either of these cases there may be macroblocks that lie outside of the viewable area.

Should these conditions be met, selector 140 passes the source stream 20 to first calculator 142. First calculator 14 calculates the value of width mb and height_mb. First calculator 142 passes the source stream 20 to second calculator 144. Second calculator 144 calculates the values of: top, bottom, left and right. Second calculator passes the stream to third calculator 146 which calculates the values of: top_mb, bottom_mb, left_mb and right_mb. Third calculator passes the stream to modifier 148 which utilizes the values calculated by the first, second and third calculators (as described earlier with regard to FIG. 1) to modify source stream 20 to create a reformatted stream which is output via communication link 22.

As one skilled in the art will recognize any of the components of pan-scan module 92 may be combined together and may indeed be a single hardware device or software procedure. The intent of the inventors when describing the functionality of pan-scan module 92 is to identify its functional steps, not to dictate a rigid structure.

The above disclosure describes how a transcoder can reduce the bit rate of a stream by transmitting only the visible area of the movie specified by pan-scan directives. Because the pan-scan conversion is performed prior to transmission, not immediately before display, the non-viewed portion of video does not need to be transmitted. Clearly the user loses the ability to select the letterbox format, but the reduction in bit rate and/or improvement in quality will justify this loss.

Although the invention has been described with reference to certain specific embodiments, various modifications thereof will be apparent to those skilled in the art without departing from the spirit and scope of the invention as outlined in the claims appended hereto.

We claim:

1. A method of determining if the content of a source MPEG-2 stream, may be reduced, said method comprising:
    a) examining said source stream at an MPEG-2 transcoder to determine if a sequence_display_extension follows the most recent sequence header and sequence extension;
    b) confirming that horizontal_size is greater than display_horizontal_size or that vertical_size is greater than display_vertical_size; and
    c) if steps a) and b) are met, reducing the content of said source stream to create a reformatted stream by substituting into said reformatted stream a portion of new horizontal_size for horizontal_size and a portion of new vertical_size for vertical_size, and substituting into said reformatted stream a portion of new horizontal_size for horizontal_size extension and a portion of new_vertical_ size for vertical size extension.

2. The method of claim 1 where step c) comprises the steps of:
    i) calculating the values of: width_mb and height_mb;
    ii) calculating the values of: top, bottom, left and right;
    iii) calculating the values: of top_mb, bottom_mb, left_mb and right_mb.

3. The method of claim 2 further comprising:
    removing picture_display_extension data from said source stream when creating said reformatted stream.

4. The method of claim 3 further comprising:
    removing macroblocks from said source stream if their horizontal position is less than left_mb or greater than right_mb or if their vertical position is less than top_mb or greater than bottom_mb, when creating said reformatted stream.

5. The method of claim 4 further comprising:
    removing slices from said source stream which contain no macroblocks, when creating said reformatted stream.

6. The method of claim 5 further comprising:
    subtracting the value of top_mb from each slice_start_code, if slice_start_code becomes less than one, then setting it to one, in said reformatted stream.

7. A video transcoder including a pan-scan module, the pan-scan module configured to perform the following steps:
    a) examining a source video stream at an MPEG-2 transcoder to determine if a sequence_display_extension follows the most recent sequence header and sequence extension;
    b) confirming that horizontal_size is greater than display horizontal_size or that vertical_size is greater than display_vertical_size; and
    c) if steps a) and b) are met, reducing the content of said source stream to create a reformatted stream by substituting into said reformatted stream a portion of new horizontal_size for horizontal_size and a portion of new_vertical_size for vertical_size, and substituting into said reformatted stream a portion of new horizontal_size for horizontal_size extension and a portion of new vertical size for vertical size extension.

8. The transcoder of claim 7 where step c) comprises the steps of:
    i) calculating the values of: width_mb and height_mb;
    ii) calculating the values of: top, bottom, left and right;
    iii) calculating the values: of top_mb, bottom_mb, left_mb and right_mb.

9. The transcoder of claim 8 wherein said pan-scan module performs the additional step of:
    removing picture_display_extension data from said source stream when creating said reformatted stream.

10. The transcoder of claim 9 wherein said pan-scan module performs the additional step of:
    removing macroblocks from said source stream if their horizontal position is less than left_mb or greater than right_mb or if their vertical position is less than top_mb or greater than bottom_mb, when creating said reformatted stream.

11. The transcoder of claim 10 wherein said pan-scan module performs the additional step of:
    removing slices from said source stream which contain no macroblocks, when creating said reformatted stream.

12. The transcoder of claim 11 wherein said pan-scan module performs the additional step of:
    subtracting the value of top_mb from each slice_start_code, if slice_start_code becomes less than one, then setting it to one, in said reformatted stream.

* * * * *